Oct. 22, 1968   M. MAYRATH   3,406,809
SWINGING DRIVE CONNECTION FOR AUGER CONVEYORS
Filed Feb. 13, 1967
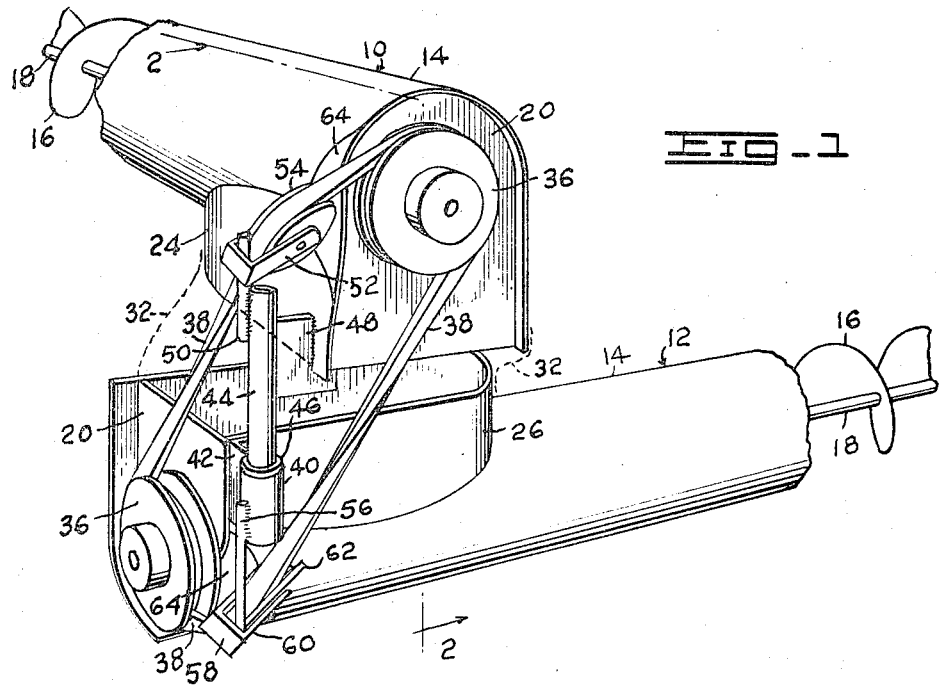
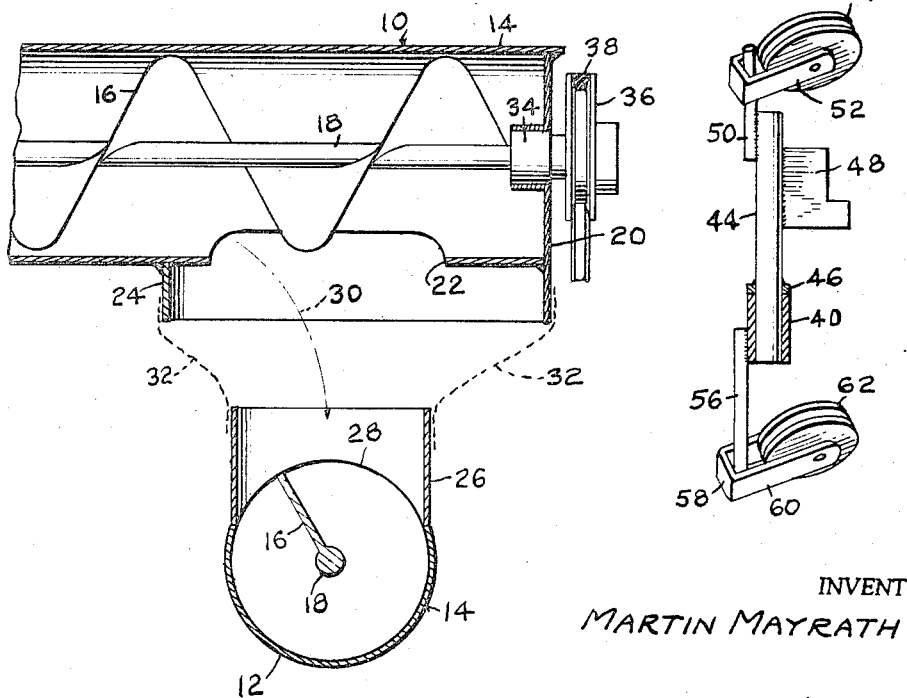
INVENTOR
MARTIN MAYRATH
BY Homer R. Montague
ATTORNEY

# United States Patent Office 3,406,809
Patented Oct. 22, 1968

3,406,809
SWINGING DRIVE CONNECTION FOR
AUGER CONVEYORS
Martin Mayrath, 10707 Lennox Lane,
Dallas, Tex. 75229
Filed Feb. 13, 1967, Ser. No. 615,667
10 Claims. (Cl. 198—92)

ABSTRACT OF THE DISCLOSURE

Two auger conveyor sections are pivoted together so that the outlet at one end of one conveyor remains generally aligned with the inlet at one end of the other, through a wide range of swing angles between the conveyor axes, allowing material to be conveyed around corners in horizontal, vertical or any combination of planes. Each conveyor shaft has an outboard pulley, and these are connected by a belt running on idlers and so arranged as to keep the proper drive length for all swing angles, so that one conveyor shaft can drive the other in all possible swing positions; a flexible casing may surround the material transfer path between the conveyors where necessary to minimize spillage.

Background of the invention

In conveying grain or other frangible material it is often desired to include turns in the travel path so as to avoid obstructions or for other reasons. Separate conveyors, each with a drive, can be used, but this is expensive and wasteful. Most wheeled or portable conveyors, such as used by farmers or contractors for example, require to be moved frequently as various jobs have to be done, and fixed-angle combinations of conveyors or conveyor sections cannot be employed efficiently. It is also very desirable to provide a power connection between the conveyor sections which does not have to be adjusted or changed as the angle of flow is altered.

Summary of the invention

The invention provides a pivotal connection between conveyor sections which allows them to be placed at various angles and maintains the drive from one conveyor shaft to the other regardless of the chosen angle. The conveyor axes may both be horizontal, both vertical, or in any combination of slopes or inclinations, and the tubular casings of the conveyor sections, adjacent their point of connection, are provided with mouth openings whereby the material discharged by one is received by the other. The pivotal axis of connection between the sections is spaced outwardly from both casings, so that the mouth openings remain substantially aligned with one another through a wide range of swing angles. A pair of idler pulleys are affixed to the respective conveyor sections, preferably by pulley yokes welded to the respective hinge components (pintle and socket), and so angled that they direct the connecting belt from one auger shaft pulley to the other regardless of the casing swingangle. By arranging the idler pulleys so that their pitch circles are both approximately tangent to the hinge axis between the conveyor sections, a single belt of proper length will provide the desired drive throughout the swinging movements of the conveyor sections, without any idler or other adjustment.

Brief description of the drawing

FIGURE 1 is a fragmentary view of a typical embodiment of the invention, showing adjacent ends of the two auger conveyors and the means for driving one from the other;

FIGURE 2 is a fragmentary sectional view on line 2—2 of FIGURE 1; and

FIGURE 3 is a detailed sectional view of the means for supporting the two augers for swinging movement relative to each other, the plane of section being taken vertically in FIGURE 1, parallel to the axis of the lower conveyor.

Description of the preferred embodiment

Referring to FIGURE 1, the numerals 10 and 12 designate, respectively, two auger conveyor units mounted to swing in spaced parallel planes. Each conveyor unit comprises a tubular casing 14 having an auger 16 therein provided with the usual shaft 18. Each conveyor is provided with an end wall 20 preferably welded in position thereon and forming a closure therefor. The end wall 20 of the conveyor 10 extends below the casing 14 thereof, while the end wall 20 of the conveyor 12 extends above its associated casing, in the particular position shown here.

Referring to FIGURE 2, it will be noted that the casing 14 of the conveyor 10 is provided with a discharge opening or mouth 22 for feeding material through a wraparound discharge shell 24 welded to the casing 14. The discharge shell is closed at its forward (left) end as shown in FIGURE 2 and has its rear or opposite end portions abutting or welded to the downward extension of adjacent end wall 20.

The lower conveyor 12 is provided with an inlet hopper 26 opening as at 28 into the lower casing 14 to supply to the lower conveyor material discharged from the upper conveyor, the material generally following a trajectory as suggested by the dotted arrow 30. If desired, the discharge shell 24 and hopper 26, which are similar in construction, may be connected by a flexible boot indicated in dotted lines at the numeral 32. In any adjusted positions of the two conveyors, the material will flow directly into the lower conveyor as indicated by the line 30, either from the action of gravity, or the combination of that force with the substantial speed with which the material is projected from the high-speed augers now in general use. The boot 32 may, of course, be used where wind conditions, or particular conveyor orientations, would otherwise involve substantial scattering of the grain or other material being conveyed.

Each end wall 20 (FIGURE 2) supports a bearing 34 for the shaft 18 of the associated auger, and beyond each end wall 20, the associated auger shaft is provided with a pulley 36. A belt 38 passes around both pulleys 36, as shown in FIGURE 1.

Means are provided for supporting the two conveyors relative to each other for swinging movement on an axis substantially perpendicular to and offset from the axes of the two conveyors. A bearing sleeve or socket 40 has a supporting plate or bracket 42 welded to the hopper 26 or end plate 20, to support the bearing sleeve 40 rigidly with respect to the lower conveyor. A shaft or hinge pintle 44 has its lower end received rotatably in the bearing 40 and is provided with a collar 46 welded thereon to limit downward movement of the pintle 44. A plate or bracket 48 is welded on the shaft 44 (FIGURE 1) and is also welded to the adjacent shell 24 or end plate 20. Accordingly, it will be apparent that the upper conveyor is supported by the shatf 44, and that such shaft is pivotally supported by the bearing or socket 40.

The pivotal supporting means just described supports idler pulleys to facilitate the reeving of the belt 38 around the pulleys 36, and to maintain a constant belt path length. Adjacent its upper end the shaft 44 has rigidly welded thereto a supporting rod 50, the upper end of which is rigidly welded to the yoke 52 rotatably supporting an idler pulley 54 around which the belt 38 passes.

A rod 56 is likewise welded to the bearing sleeve 40 and projects therebelow. The lower end of this rod is rigidly welded to the base member 58 or one arm of a yoke 60 rotatably supporting an idler pulley 62 similar to the pulley 54. The belt 38 passes around the idler 62 as will be apparent. Referring to FIGURE 1, it will be noted that the common axis of the shaft 44 and sleeve 40 passes through the idlers 54 and 62 just within the peripheries thereof at the sides of the idlers remote from their respective pulleys 36. In other words, the hinge axis substantially intersects the pitch circles of the two idlers in respective tangential planes.

The idlers 54 and 62 are arranged, respectively, relatively close to the upper and lower pulleys 36. In order to provide clearance for the idlers 54 and 62, the ends of the casings 14 may have to be distorted or chamfered as at 64. This may be necessary in view of the required angular arrangement of the idlers and in order to directly feed the belt between the idlers 54 and 62 and pulleys 36.

*Operation*

The lower conveyor is supported in any suitable or conventional manner relative to the ground or other supporting surface, and it will be obvious that the end of conveyor 10 is pivotally supported with respect to the conveyor 12 by the shaft 44 and bearing sleeve 40. Either auger may be power driven, and will transmit power through the belt 38 to the other auger. For example, assuming that the lower auger is power driven, the upper pulley 36 and its associated auger will be driven from the lower pulley 36.

In practice, it has been found that the upper conveyor may be swung through an arc of from 45 degrees relative to the lower conveyor to an angle of 135 degrees, and in any adjusted position of the conveyors, material will be discharged through the opening 22, following substantially the trajectory 30 to drop into the lower conveyor. Thus, the single conveyor assembly may be employed for conveying material around obstacles, for example around the corner of a barn, or even on inclines up to vertical. As indicated, the flexible boot 32, which forms no essential part of the present invention, ordinarily is not required, but may be employed in windy weather, or for other inclinations, to prevent material from blowing away or otherwise escaping from the space between the shell 24 and the hopper 26.

The general angularity of each idler with respect to its associated auger pulley is fixed, and variable twists in the belt due to angular adjustment of the two conveyors are accommodated in the longer runs of the belts between each pulley 36 and the idler associated with the other conveyor. Thus it has been found that the belt drives efficiently in any adjusted position of the conveyors. In this connection it will be noted that each idler pulley has its axis fixed with respect to its associated conveyor elements, the upper yoke 52 being welded in fixed relation to the pintle shaft 44 and the lower yoke 60 being welded in fixed relation to the bearing sleeve or socket 40.

It also will be noted that the common axis of the shaft 44 and sleeve 40 always passes through the pitch circles of the two idlers, in planes nearly tangent thereto. For this reason, the swinging of the one conveyor relative to the other does not materially change the overall length of the belt, and undue stretching is thus avoided. While provision could be made for tightening the belt if necessary, this usually is unnecessary since present types of nylon and other plastic belts can be prestretched before being mounted on the pulleys and will not appreciably stretch in the use of the conveyors becasue of the mounting of the turning axis of the shaft 44 and bearing sleev 40 relative to the idlers.

While the structure has been generally described with respect to horizontal positions of the two conveyors, it operates as well for other orientations of the conveyors. In other words, it is not necessary for both (or either) of the conveyors to be mounted in the horizontal plane.

It will be seen that the invention satisfies the stated purposes in a very simple, economical yet effective manner, but the construction described can be varied as to many details without departing from the true spirit and scope of the invention as defined in the appended claims.

What is claimed is:

1. A dual auger conveyor mechanism comprising a pair of auger conveyors mounted in parallel planes, shaft means offset from the axes of said conveyors for supporting them for turning movement about an axis perpendicular to the said planes of said conveyors, each conveyor having an auger and an auger shaft projecting from one end of such conveyor, a pulley mounted on each shaft, an idler in relatively close proximity to each shaft and mounted for rotation on respective axes angled with respect to the axis of the adjacent conveyor, and a belt passing around said pulleys and said idlers, said end of one of said conveyors overlying said end of the other conveyor and having a material discharge opening, and the other conveyor having an opening to receive material from said discharge opening.

2. A conveying mechanism according to claim 1 wherein said turning axis passes substantially through the pitch circles of said idlers adjacent the sides thereof remote from the associated pulleys.

3. A conveying mechanism according to claim 1 wherein said supporting means comprises a pair of coaxial members each of which is fixed with respect to one of said conveyors.

4. A conveying mechanism according to claim 1 wherein said supporting means comprises a pair of coaxial members each of which is fixed with respect to one of said conveyors, a yoke supporting each idler for rotation, and means securing each yoke to one of said coaxial members.

5. A conveying mechanism according to claim 1 wherein said supporting means comprises a pair of coaxial members each of which is fixed with respect to one of said conveyors, the axis of said coaxial members passing substantially through the pitch circles of said idlers adjacent the sides thereof opposite the associated pulleys.

6. A conveying mechanism according to claim 1 wherein said supporting means comprises a pair of coxial members each of which is fixed with respect to one of said conveyors, the axis of said coaxial members passing through said idlers adjacent the sides thereof opposite the associated pulleys, a yoke supporting each idler for rotation, and means affixing each yoke to one of said coaxial members.

7. A conveying mechanism according to claim 1 wherein said means for supporting said conveyors for turning movement relative to each other comprises a sleeve fixed to one conveyor, a shaft fixed to the other conveyor coaxial with and rotatable in said sleeve and having means for limiting axial movement thereof relative to said sleeve, a yoke supporting each idler for rotation on an axis tilted with respect to the axis of its associated conveyor, and means affixing said yokes respectively to said coaxial shaft and to said sleeve.

8. A conveying mechanism according to claim 7 wherein the common axis of said sleeve and said coaxial shaft passes through said idlers adjacent the sides thereof opposite said pulleys.

9. A conveying mechanism according to claim 7 wherein the means for fixing said yokes respectively to said sleeve and to said coaxial shaft comprises a rod welded to each yoke, said rods being welded respectively to said sleeve and to said coaxial shaft.

10. In combination, a pair of conveyors each including a conveying auger and its auger shaft, said conveyors being hinged to one another for relative swinging movement about an axis offset laterally from both of said shafts, with the outlet end of one conveyor generally overlaying the inlet end of the other conveyor in all of their swinging positions, a pulley fastened to each of said shafts, a pair of idlers having their axes fixed in position with respect to the respective conveyors and their pitch circles substantially tangent to a plane containing the common hinge axis of said conveyors and a belt reeved tightly over said pulleys and said idlers, whereby the belt remains in taut condition throughout a wide range of angles of swing of said conveyors.

References Cited

UNITED STATES PATENTS

| | | | |
|---|---|---|---|
| 986,302 | 3/1911 | Mielke | 198—93 |
| 1,044,329 | 11/1912 | Wood | 198—93 |
| 1,190,564 | 7/1916 | Lindsay | 198—93 |
| 2,194,006 | 3/1940 | Carter | 198—9 |
| 2,662,634 | 12/1953 | Tintes | 198—9 |
| 2,800,991 | 7/1957 | Manierre | 198—92 |
| 3,235,061 | 2/1966 | Craig | 198—203 |
| 3,291,284 | 12/1966 | May et al. | |
| 3,308,926 | 3/1967 | James | 198—100 |

EVON C. BLUNK, *Primary Examiner.*

M. L. AJEMAN, *Assistant Examiner.*